US 7,845,004 B2

(12) United States Patent
Bardsley et al.

(10) Patent No.: US 7,845,004 B2
(45) Date of Patent: Nov. 30, 2010

(54) CORRELATING NETWORK INFORMATION AND INTRUSION INFORMATION TO FIND THE ENTRY POINT OF AN ATTACK UPON A PROTECTED COMPUTER

(75) Inventors: Jeffrey Scott Bardsley, Cary, NC (US); Ashley Anderson Brock, Morrisville, NC (US); Nathaniel Wook Kim, Raleigh, NC (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2869 days.

(21) Appl. No.: 09/917,368

(22) Filed: Jul. 27, 2001

(65) Prior Publication Data
US 2003/0023876 A1 Jan. 30, 2003

(51) Int. Cl.
*G08B 23/00* (2006.01)
(52) U.S. Cl. .................................................. 726/22
(58) Field of Classification Search ......... 713/200–201
See application file for complete search history.

(56) References Cited

U.S. PATENT DOCUMENTS

| 5,511,122 | A | 4/1996 | Atkinson | 380/25 |
|---|---|---|---|---|
| 5,805,801 | A | 9/1998 | Holloway et al. | 395/187.01 |
| 5,835,727 | A | 11/1998 | Wong et al. | 395/200.68 |
| 5,892,903 | A | 4/1999 | Klaus | 395/187.01 |
| 5,905,859 | A | 5/1999 | Holloway et al. | 395/187.01 |
| 6,006,272 | A | 12/1999 | Aravamudan et al. | 709/245 |
| 6,119,236 | A | 9/2000 | Shipley | 713/207 |
| 6,170,061 | B1 | 1/2001 | Beser | 713/201 |
| 6,539,435 | B2 * | 3/2003 | Bolmarcich et al. | 719/310 |
| 6,553,005 | B1 * | 4/2003 | Skirmont et al. | 370/285 |
| 6,578,147 | B1 * | 6/2003 | Shanklin et al. | 713/200 |
| 6,735,702 | B1 * | 5/2004 | Yavatkar et al. | 713/201 |

(Continued)

FOREIGN PATENT DOCUMENTS

WO 99/48303 9/1999

(Continued)

OTHER PUBLICATIONS

"Network- vs. Host-based Intrusion Detection, a Guide to Intrusion Detection Technology", Oct. 2, 1998, Internet Security Systems, http://documents.iss.net/whitepapers/nvh_ids.pdf.*

(Continued)

*Primary Examiner*—Jeffrey D Popham
(74) *Attorney, Agent, or Firm*—Yee & Associates, P.C.; John R. Pivnichny

(57) ABSTRACT

A method for determining the entry point of an attack by a vandal such as a hacker upon a device such as a computer or a server such as a web server that operates under the protection of an intrusion detection system. Intrusion detection information regarding the attack and network information regarding the attack are correlated, and the entry point of the attack thereby deduced. In one embodiment, a source address of a message representative of the attack is found in a router table of a router that provides a connection supporting the attack. Logical ports of the connection are determined, and the corresponding physical ports found, thereby identifying the attack's entry point into the protected device.

20 Claims, 5 Drawing Sheets

U.S. PATENT DOCUMENTS 6,973,040 B1 * 12/2005 Ricciulli .................. 370/241

FOREIGN PATENT DOCUMENTS

WO 00/62167 10/2000

OTHER PUBLICATIONS

Hunt, G. et al., "Network Dispatcher: a connection router for scalable Internet services", Apr. 1998, Proceedings of the 7th International World Wide Web Conference (WWW7), http://www.unizh.ch/home/mazzo/reports/www7conf/fullpapers/1899/com1899.htm.*

Hunt et al., "Network Dispatcher: a connection router for scalable Internet services", Oct. 2, 1998, Internet Security Systems, obtained from http://www.unizh.ch/home/mazzo/reports/www7conf/fullpapers/1899/com1899.htm.*

Boivie, R. "Method for Protecting Web Servers Against Various Forms of Denial-of-Service Attacks", IBM U.S. Appl. No. 09/650,524, filed Aug. 30, 2000.

* cited by examiner

CORRELATING NETWORK INFORMATION AND INTRUSION INFORMATION TO FIND THE ENTRY POINT OF AN ATTACK UPON A PROTECTED COMPUTER

FIELD OF THE INVENTION

The present invention is related to the field of data processing security, and more particularly to a method for determining the entry point or exit point of an attack by a vandal upon a device such as a computer or a web server that is protected by an intrusion detection system.

BACKGROUND

Computer activities are sometimes subject to electronic vandalism. For example, a vandal or hacker may attack an Internet web server by flooding it with a torrential flow of disruptive messages that overload the server to the point of functional failure. Attacks of this kind are called "denial of service" attacks. During a denial of service attack, the vandal may fraudulently assume a number of different electronic identities, often by including messages in the disruptive flow that have a variety of source addresses. To combat such attacks, a web server may rely upon intrusion detection equipment that examines incoming messages. Such equipment detects the onslaught of a vandal's attack, reads source addresses including the addresses that the attacker usurps and fraudulently re-uses, and issues alerts upon detection of all messages that exhibit characteristics of the attack.

Computers are also subject to other kinds of attacks, for example attacks that are mounted by parties commonly known as hackers. A vandal such as a hacker may attempt to intrude upon a computer in order to steal information in an act of industrial espionage, or to implant a virus, or to alter records to the detriment or benefit of someone's interests or reputation. Again, to combat such activities, computers may be monitored and protected by intrusion detection systems.

Intrusion detection systems are effective and useful for their intended purposes. Unfortunately, however, the protected computer, the intrusion detection system, and the associated network equipment, such as firewalls and routers, are separate devices today whose operations are essentially uncoordinated. This lack of coordination limits the capability of the combined system to respond to attacks in any useful way except for detecting the presence of an attack and attempting to limit—by filtering—any damage that might result.

For example, when an intrusion detection system detects a denial of service attack upon a computer, the attack may be blocked by a firewall to the extent possible by source-address filtering. Blocking such an attack may, however, have adverse and unintended consequences. In particular, the use of protective filtering may play into the hands of a vandal who resorts to "spoofing." A spoofer is an attacker who uses a fake source address that fraudulently identifies the spoofer as another source. Spoofing attacks may have serious consequences, for example when the spoofer usurps the source address of a web server's most important customer. In such instances, the administrators of the network of the targeted web server may unknowingly decide to filter-out all messages that bear the customer's source address, inadvertently including messages actually sent by the customer, using protective equipment such as firewalls and routers. Consequently, the web server experiences both the trauma of an attack and the adverse consequences that come with mounting a defense that filters-out legitimate messages sent by the server's most important customer. Moreover, Denial-of-Service (DoS) attacks are generally characterized by extraordinary volumes of data sent to the targeted system or network. Consequently, even if a firewall were configured to block the DoS traffic, the firewall would be quickly overwhelmed.

As the attack wears on, technicians pore over volumes of data dumped by the intrusion detection system and the network equipment, in an ad hoc attempt to determine the attack's entry point into the protected device. Unfortunately, with such an unstructured approach the entry point may not be found for several hours, during which time the intrusion detection system's filtering impedes the operation of the computer or web site under attack.

In other situations, the attack itself may be short lived, for example as in a hacker's attempt to steal information from a protected computer. By the time technicians have completed their unstructured situational analysis, the attack may be over and the hacker may have succeeded before his efforts could be blocked by filtering the computer's outbound flow of information.

Thus there is a need for an improved defense against vandals that provides a quick and efficient way of determining the entry point of an attack upon a device that is protected by an intrusion detection system, so that measures may be taken to stop the attack closer to its source or to aid in forensic investigations that follow.

SUMMARY OF THE INVENTION

The present invention provides a way of determining the entry point of an attack by a vandal such as a hacker upon a protected device such as a computer or a server such as a web server that operates under the protection of an intrusion detection system. According to the present invention, intrusion detection information regarding an attack and network information regarding the attack are correlated, and from this information the entry point of the attack into the protected device is identified. Thus, the entry point or exit point of the DoS traffic may be identified as far back in the network as possible—i.e., as far as possible away from the protected device.

One embodiment of the invention pertains to a web server that is protected by an intrusion detection system and connected to the Internet through a router. When the intrusion detection system detects an attack upon the web server, the intrusion detection system provides intrusion information to a correlation engine, which information may include the source address, destination address, protocol type of messages included in the attack, and so forth. The correlation engine receives network information from the router, which information may be a router table that includes the source address, destination address, protocol type, logical input port identifier, and logical output port identifier of each connection made through the router.

The correlation engine then correlates the intrusion information and the network information to deduce the logical entry point of the attack. For example, the correlation engine may correlate the intrusion information with the network information by finding, in the router table, occurrences of the intrusion information's source address, destination address, or protocol type. When a match is found between a record of the router table and the intrusion information, the correlation engine concludes that the logical entry point of the attack is the logical input port and logical output port that support the connection through the router. By consulting a mapping table, the correlation engine then identifies physical entry point of the attack by identifying the router's physical ports that are associated with the logical ports of the entry point. The mapping table may be included in the router table, or may be stored separately in the router or elsewhere. An alert identifying the entry point of the attack is sent to network management center, which may then block the attacking traffic from reaching the affected ports, or which may work with service providers to stop the attack closer to its source.

Thus the present invention provides an effective and efficient way of identifying the entry point of an attack upon a device such as a computer or a web server that is protected by an intrusion detection system. The present invention also encompasses situations involving a plurality of routers that are connected in a web or a mesh, and the methods of the present invention are used to identify the entry points of the attacking traffic on all the affected routers. These and other aspects of the invention will be more fully appreciated when considered in light of the following detailed description and drawings.

DETAILED DESCRIPTION OF THE INVENTION

The present invention provides a way of determining the entry point of an attack upon a device that is protected by an intrusion detection system. A correlation engine correlates network information and intrusion information, and thereby deduces the logical entry point of the attack, and from the logical entry point of the attack deduces the physical entry point of the attack.

Figure 1:
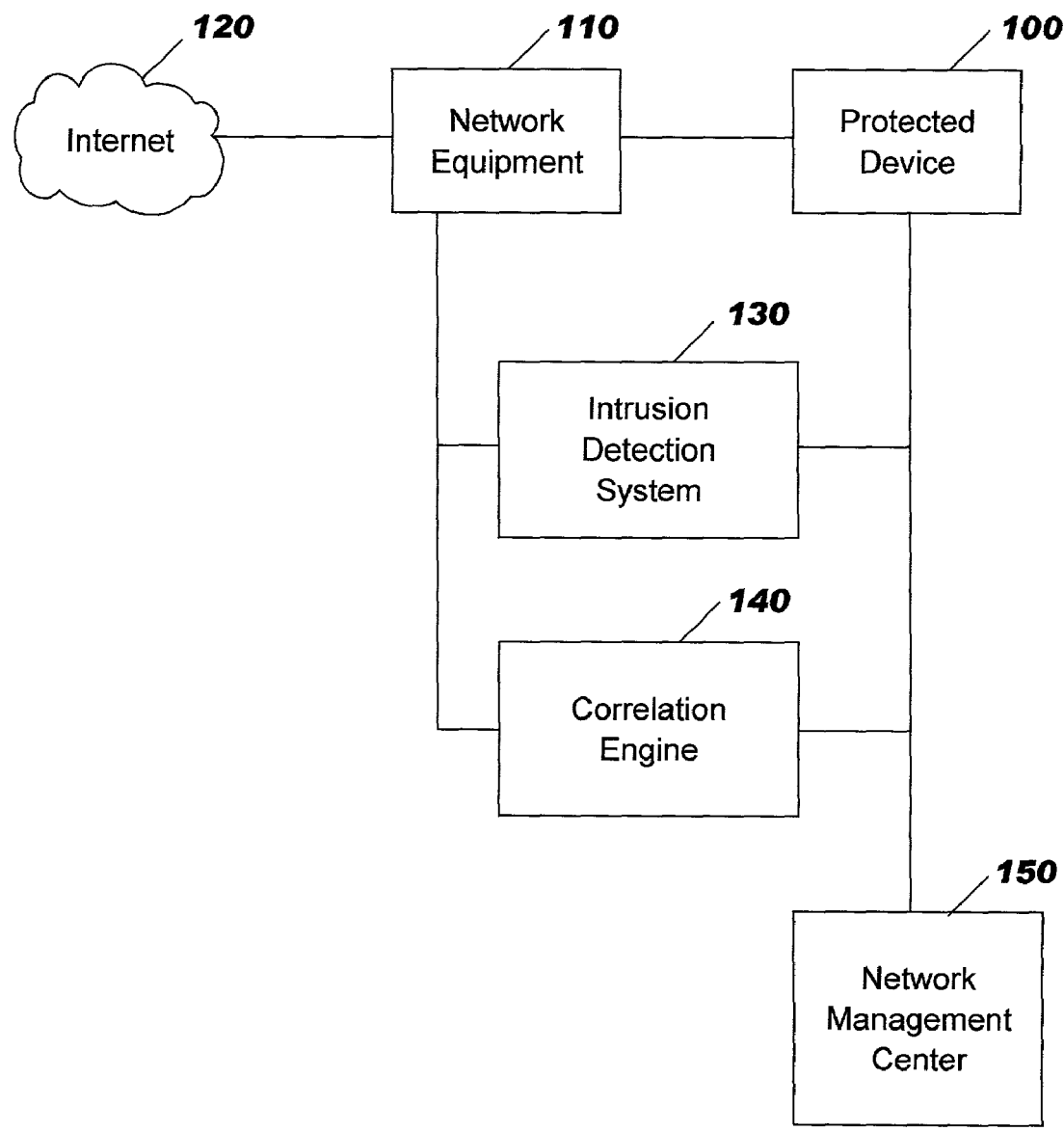
FIG. 1, which is a block diagram illustrating exemplary use of the present invention, includes a protected device such as a web server, network equipment such as a router, an intrusion detection system such as a network based intrusion detection system, and a correlation engine.

FIG. 1 shows an intrusion detection system 130 that protects a protected device 100 against deliberate attacks by vandals or inadvertent attacks by others having the apparent characteristics of a vandal's attack. Here, the protected device 100 may be a computer, a server such as a web server, or other similar devices. Although the intrusion detection system 130 of FIG. 1 shows the use of network-based intrusion detection equipment for the purpose of ready discussion, the present invention encompasses the use of other kinds of intrusion detection equipment as well, including host-based intrusion detection equipment, application-based intrusion detection equipment, and so forth.

In FIG. 1, the protected device 100 is connected by network equipment 110 to the Internet 120 or to another communication network, for example an Intranet or other local or wide-area communication network. The network equipment 110 may be a network router, a firewall with routing capability, a network dispatcher, a load balancer, or other equipment for supporting connections between the Internet 120 and the protected device 100. FIG. 1 also shows a correlation engine 140, which correlates network information from the network equipment 110 and intrusion information from the intrusion detection system 130 as explained below. The correlation engine 140 may be a programmable processor or its logical equivalent. In FIG. 1, the correlation engine 140 is shown apart from the other elements for purposes of clear discussion; nevertheless, the correlation engine 140 may be part of the intrusion detection system 130 as well as a stand-alone element or otherwise integrated with other elements shown in FIG. 1. A network management center 150 may oversee the operation of the elements and system of FIG. 1.

Figure 2:
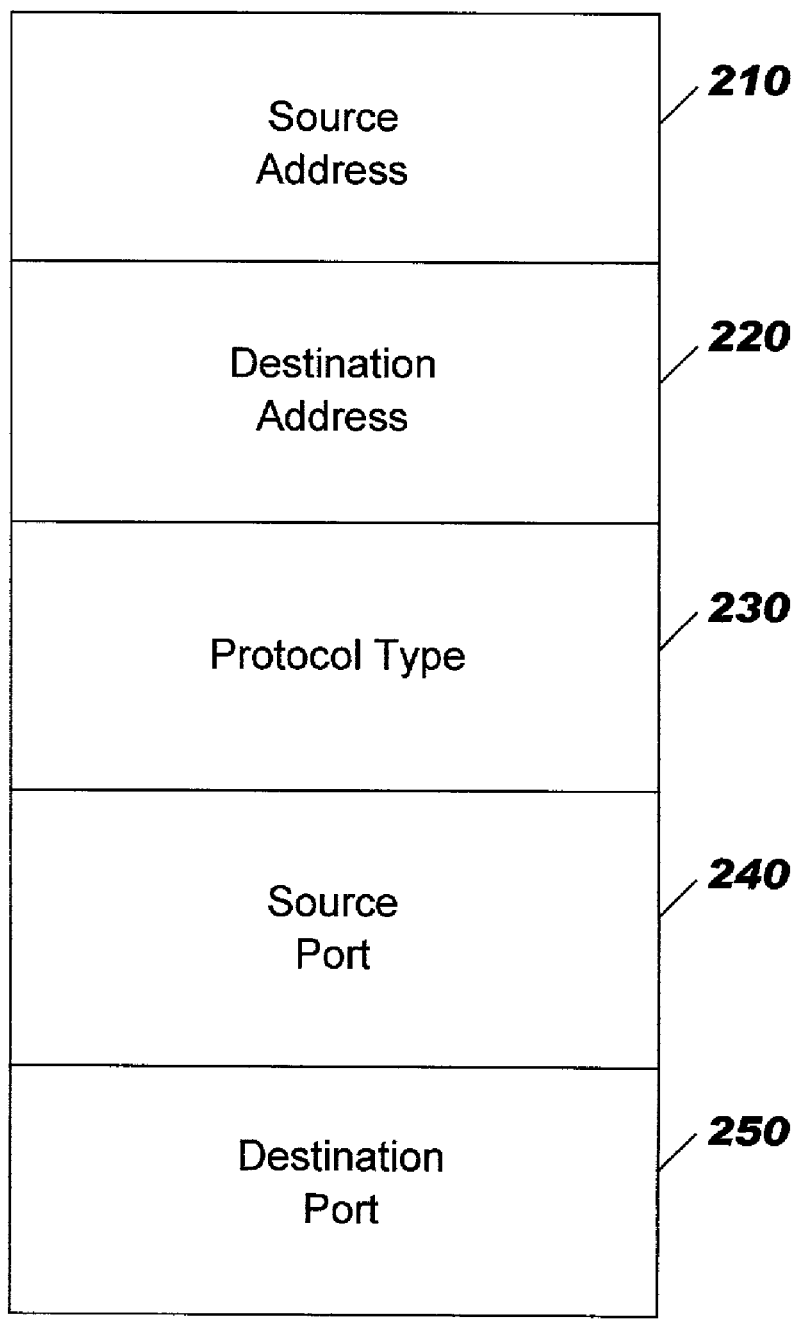
FIG. 2 shows an exemplary structure of intrusion information provided by the intrusion detection system of FIG. 1.

When the intrusion detection system 130 detects an intrusion, it provides intrusion information 200 regarding the intrusion. FIG. 2 shows an exemplary structure of the intrusion information 200. In the exemplary structure of FIG. 2, the intrusion information 200 includes a source address 210, a destination address 220, a protocol type 230, a source port 240, and a destination port 250. The source address 210, destination address 220, protocol type 230, source port 240, and destination port 250 may be the respective elements of a message judged by the intrusion detection system 130 to be representative of messages that constitute the attack upon the protected device 100. For example, when the protected device 100 is a web server connected to the Internet 120, the protocol type 230 may be TCP, and the source address 210 and the destination addresses 220 of the message representative of the attack may be IP addresses. The port information, i.e., the source port 240 and the destination port 250, would concern the transport layer of the communication-protocol stack rather than logical ports on the network equipment 110. Those skilled in the art will appreciate, however, that the structure and particular elements of FIG. 2 are illustrative rather than limiting, and that the intrusion information 200 may come in different forms and may include different elements within the scope of the present invention.

Figure 3:
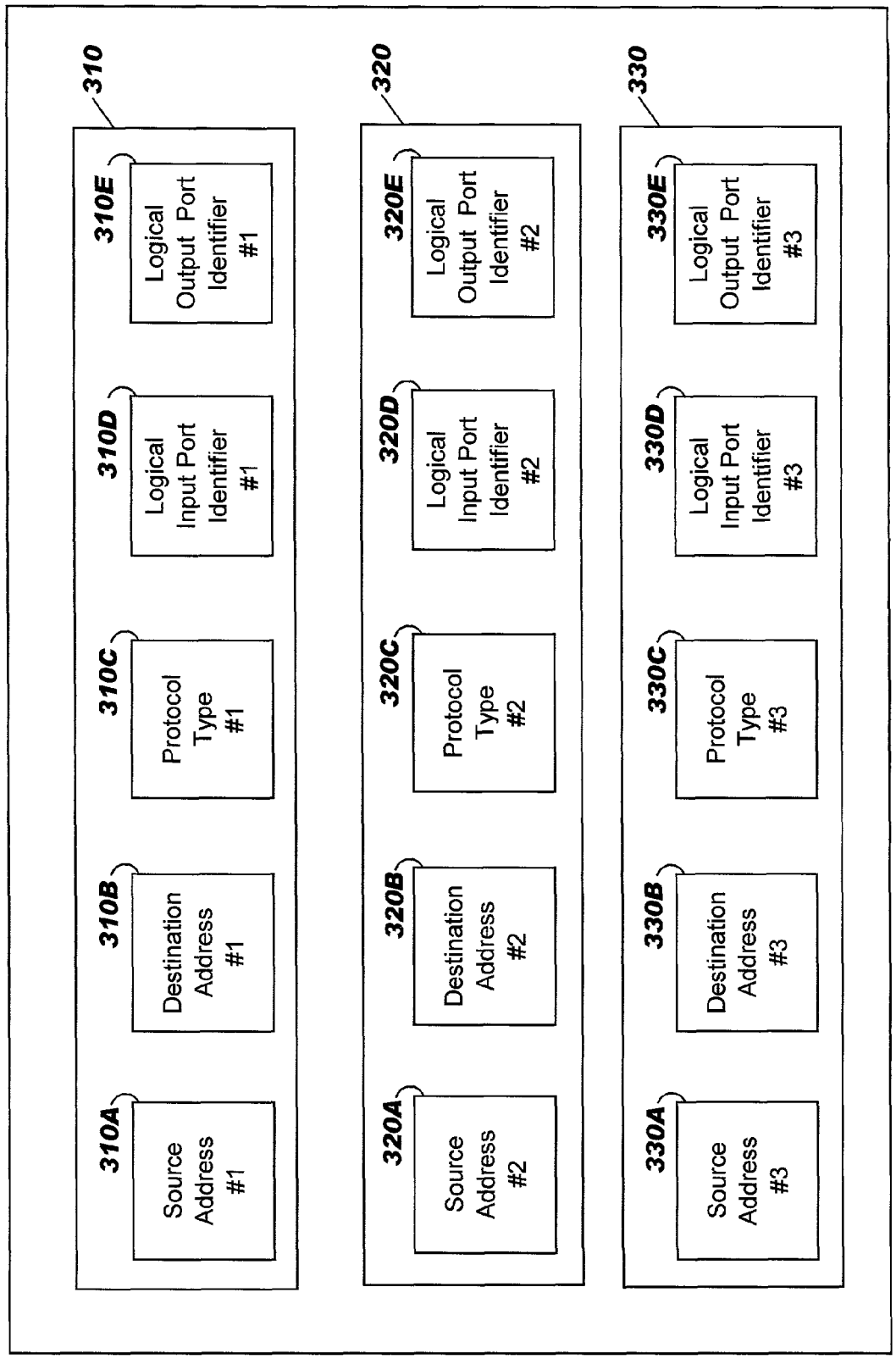
FIG. 3 shows an exemplary structure of network information provided by the network equipment of FIG. 1.

When the intrusion detection system 130 detects an intrusion, the network equipment 110 provides related network information 300. FIG. 3 shows an exemplary structure of the network information 300. Although the network information 300 may take different forms depending on the nature of the network equipment 110, the exemplary network information 300 of FIG. 3 has the nature of a router table comprising three records 310 through 330, each of which describes a connection through the router. The records 310 through 330 may contain source addresses 310A through 330A, destination addresses 310B through 330B, protocol types 310C through 330C, logical input port identifiers 310D through 330D, and logical output port identifiers 310E through 330E, as shown in FIG. 3. The foregoing structure is illustrative, of course, rather than limiting, and other router implementations may store other information, for example MPLS labels, class of service information, and so forth.

In the intrusion information 200 and in the network information 300, the source addresses 210 and 310A through 330A and the destination addresses 220 and 310B through 330B need not necessarily be specific, single addresses; rather, they may also be ranges of addresses, or may be addresses that identify subnets, and so forth.

Figure 4:
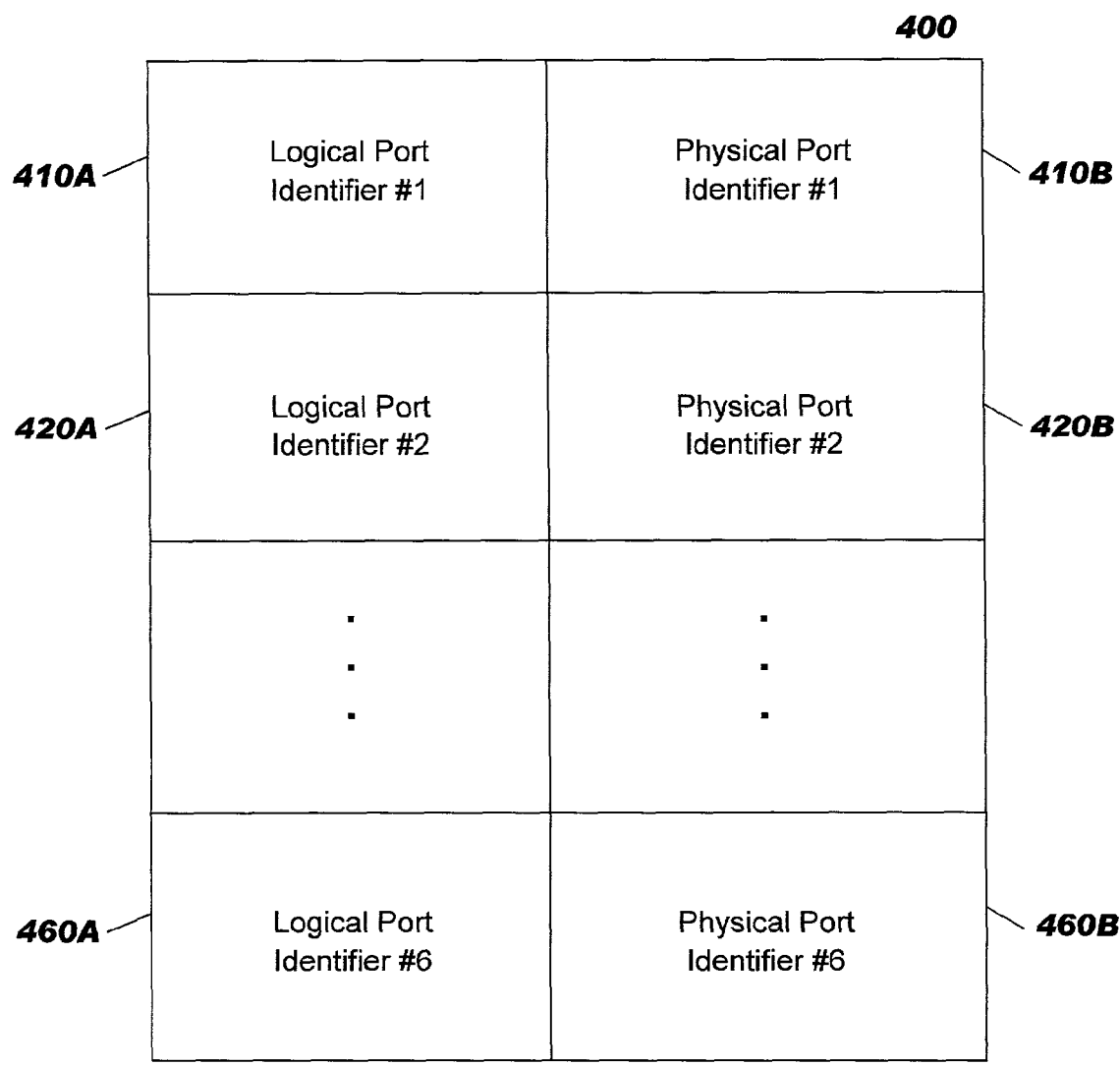
FIG. 4 shows an exemplary structure of a mapping table that maps logical ports to physical ports of the network equipment of FIG. 1.

FIG. 4 shows an exemplary structure of a mapping table 400 for mapping the logical port identifiers 410A through 460A included in the network information 300 to physical port identifiers 410B through 460B of the network equipment 110. The table concerns network equipment 110 such as routers, and the mappings of FIG. 4 should not be confused with ports and mappings of the transport layer. The exemplary mapping table 400 of FIG. 4 shows six logical port identifiers 410A through 460A and six physical port identifiers 410B through 460B in keeping with the need to map the six logical port identifiers 310D through 330D and 310E through 330E shown in the exemplary network information 300 of FIG. 3.

Although FIG. 4 shows the mapping table 400 as a separate table, the mapping table 400 may be part of the network information 300 itself, or may be kept elsewhere; moreover, the mapping is not required to be one-to-one.

Figure 5:
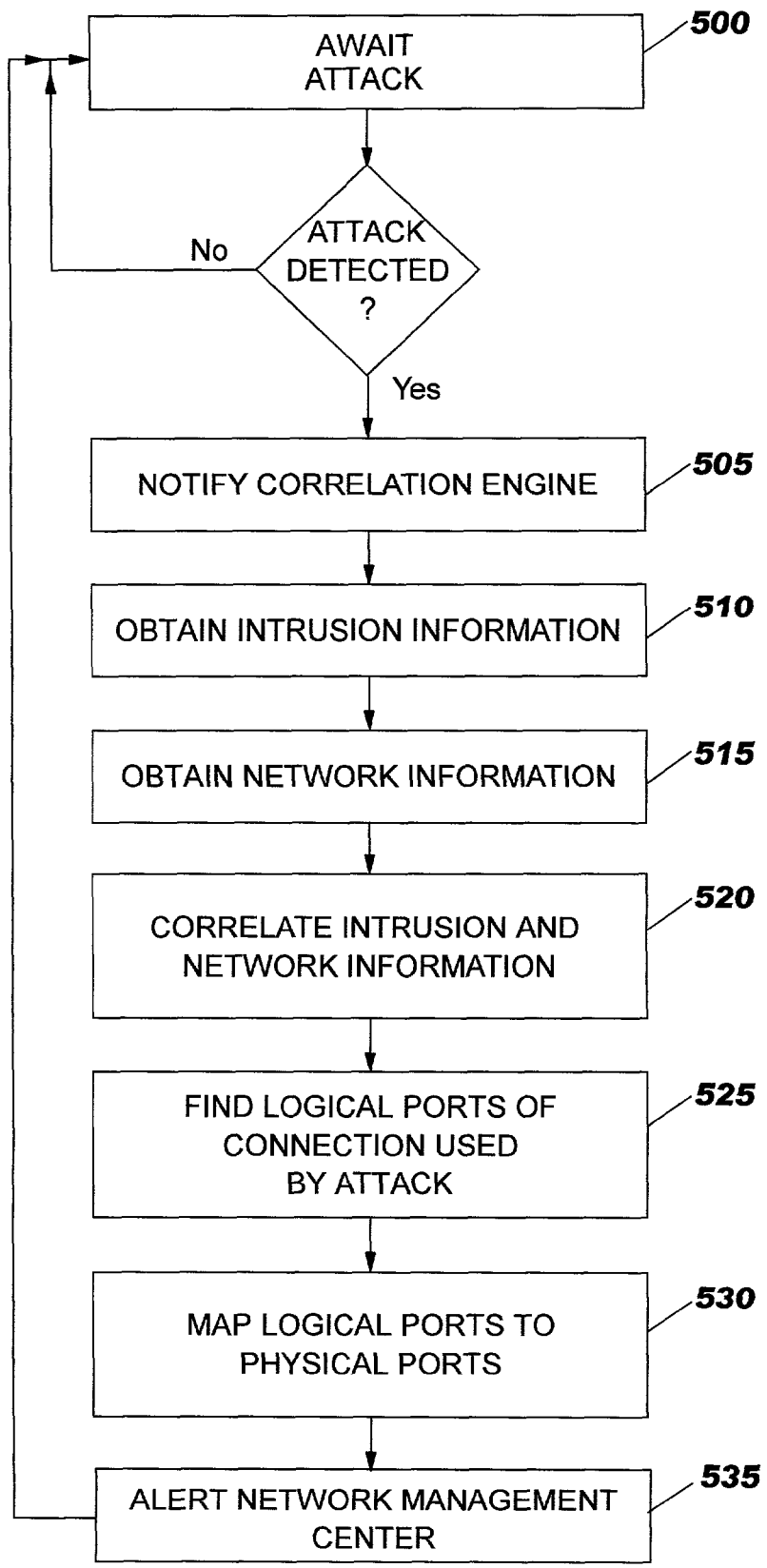
FIG. 5 is a flowchart showing aspects of the operation of the invention.

FIG. 5 shows aspects of the operation of the invention. The intrusion detection system 130 awaits an attack (step 500) upon the protected device 100. When an attack is not detected, the intrusion detection system 130 continues to wait (step 500). Otherwise (i.e., an attack is detected), the intrusion detection system 130 notifies the correlation engine 140 of the presence of an attack (step 505). The correlation engine 140 obtains intrusion information 200 from the intrusion detection system 130 (step 510) and network information 300 from the network equipment 110 (step 515).

The correlation engine 140 correlates the intrusion information 200 and the network information 300, looking for common elements (step 520). For example, the correlation engine 140 may search through the network information 300, looking for a record that has a source address that matches the source address 210 of the intrusion information 200. Alternatively, the correlation engine 140 may look through the network information 300 for a match of the destination address 220 of the intrusion information 200, or a match of the protocol type 230 of the intrusion information 200, or a match of two of the three elements 210 through 230 of the intrusion information 200, or a match of all three elements 210 through 230 of the intrusion information 200, or a match on other data which are not explicitly described herein but whose suitability would be evident to those skilled in the art once taught the present invention.

Finding a match as just described identifies one of the records 310 through 330 of the network information 300 that describes the connection through the network equipment 110 used by the attack. The analysis engine 140 examines the identified record to determine which of the logical input port identifiers 310D through 330D and the logical output port identifiers 310E through 330E is associated with the connection used by the attack (step 525). The correlation engine 140 then consults the mapping table 400 in order to map the logical input port and logical output port identified with the attack to the corresponding physical input port and physical output port of the network equipment 110 (step 530). The entry point of the attack into the protected device 100 has now been identified, and the correlation engine 140 alerts the network management center 150 (step 535) of the presence of attack and the entry point of the attack—i.e., the ports supporting the connection used by the attack—and then awaits another attack (step 500). Although the invention is described above mainly in terms of finding the entry point of an attack upon a protected computer, the same methods may be applied as well to finding the exit point of an attack. Consequently, for descriptive convenience, the term "portal" is used herein inclusively; the portal of an attack may be an entry point of the attack or the exit point of the attack.

From the foregoing description, those skilled in the art will appreciate that the present invention improves the performance of equipment used to protect a computer, a web server, and so forth, from attack by vandals, by conveniently identifying the entry point of the attack into the protected device. The foregoing description is illustrative rather than limiting, however, and the present invention is limited only by the following claims.

We claim:

1. A computer-implemented method of identifying the entry point of an attack upon a device protected by an intrusion detection system, the method comprising the steps of:

obtaining intrusion information, from an intrusion detection system, regarding an attack upon a device protected by the intrusion detection system;

obtaining network information, from network equipment connected to the device, regarding the attack;

determining a logical entry point of the attack using a correlation engine to correlate the intrusion information and the network information; and identifying a physical entry point associated with the logical entry point.

2. The computer-implemented method of claim 1, wherein the intrusion information includes an address.

3. The computer-implemented method of claim 2, wherein the address is a source address.

4. The computer-implemented method of claim 2, wherein the address is a destination address.

5. The computer-implemented method of claim 2, wherein the network information includes a logical port identifier of a logical port associated with the address.

6. The computer-implemented method of claim 5, wherein the step of determining a logical entry point includes the step of finding, in the network information, the logical port identifier of the logical port associated with the address.

7. The computer-implemented method of claim 5, wherein the step of identifying a physical entry point includes the step of identifying a physical port associated with the logical port.

8. The computer-implemented method of claim 1, wherein the network equipment includes a firewall with routing function.

9. The computer-implemented method of claim 1, wherein the network equipment includes a network dispatcher.

10. The computer-implemented method of claim 1, wherein the network equipment includes a load balancer.

11. The computer-implemented method of claim 1, wherein the intrusion detection system includes network based intrusion detection equipment.

12. The computer-implemented method of claim 1, wherein the intrusion detection system includes host based intrusion detection equipment.

13. The computer-implemented method of claim 1, wherein the intrusion detection system includes application based intrusion detection equipment.

14. A method of identifying the entry point of an attack upon a device protected by an intrusion detection system, said device one of a plurality of devices connected by a network, the method comprising the computer-implemented steps of:

detecting an attack on the device;

notifying a correlation engine of the attack on the device;

obtaining intrusion information regarding the attack;

obtaining network information regarding the attack;

using the correlation engine, correlating the intrusion information and the network information to produce correlation information;

using the correlation information, finding on the network a logical port of connection used by the attack; and mapping the logical port on the network to a physical port on the network using the correlation engine.

15. The method of claim 14 comprising the further step of: alerting a network manager to the location of the logical port and of the physical port.

16. The method of claim 14 wherein the step of mapping is performed using the correlation engine.

17. The method of claim 14 wherein:

the intrusion information includes an address; and the network information includes a logical port identifier of a logical port associated with the address.

18. An apparatus for detecting a point of an attack on a network, the apparatus comprising:

network equipment for connecting a protected device to a network;

an intrusion detection system comprising intrusion detection equipment;

a correlation engine adapted to:

receive a notification of an attack on the protected device;

receive intrusion information regarding the attack;

receive network information regarding the attack, wherein the network information pertains to the network;

correlate the intrusion information and the network information to produce correlation information;

use the correlation information to find on the network a logical port of connection used by the attack; and map the logical port on the network to a physical port on the network using the correlation engine.

19. The apparatus of claim 18 further comprising:

means for alerting a network manager to the location of the logical port and of the physical port.

20. The apparatus of claim 18 wherein:

the intrusion information includes an address; and the network information includes a logical port identifier of a logical port associated with the address.

* * * * *